United States Patent [19]

Satoh et al.

[11] 4,395,362

[45] Jul. 26, 1983

[54] ELECTROCONDUCTIVE RESIN COMPOSITE MATERIAL FOR MOLDING

[75] Inventors: Hiroaki Satoh, Tokyo; Masaru Hiruta, Iwaki, both of Japan

[73] Assignee: Kureha Kagaku Kogyo Kabushiki Kaisha, Tokyo, Japan

[21] Appl. No.: 296,523

[22] Filed: Aug. 26, 1981

[51] Int. Cl.³ .............................................. H01B 1/06
[52] U.S. Cl. .................................. 252/511; 524/495; 524/496; 525/191; 525/221; 525/386
[58] Field of Search ................ 524/495, 496; 525/221; 525/386, 191; 252/511

[56] References Cited

U.S. PATENT DOCUMENTS

| | | | |
|---|---|---|---|
| Re. 28,336 | 2/1975 | Dalton | 252/511 |
| 3,745,142 | 7/1973 | Mahlman | 524/496 |
| 3,902,532 | 9/1975 | Caron | 252/511 |
| 3,963,647 | 6/1976 | Straub | 524/496 |
| 4,002,595 | 1/1977 | Adelman | 524/496 |
| 4,278,510 | 7/1981 | Chien et al. | 252/511 |

*Primary Examiner*—Josephine Barr
*Attorney, Agent, or Firm*—Finnegan, Henderson, Farabow, Garrett & Dunner

[57] ABSTRACT

An electroconductive resin composite material for molding having excellent mechanical strength and electrical properties. The resin comprises 100 parts by weight of polypropylene, from 10 to 50 parts by weight of a modified polypropylene obtained either by chemically modifying polypropylene with an organic unsaturated carboxylic acid or by copolymerizing propylene and the organic unsaturated carboxylic acid, from 5 to 65 parts by weight of carbon fiber having a diameter of 5 to 20 micrometers, the ratio of length to diameter of the fiber being not less than 10, and from 5 to 65 parts by weight of electroconductive carbon black, the specific surface area being at least 800 m²/g.

7 Claims, 4 Drawing Figures

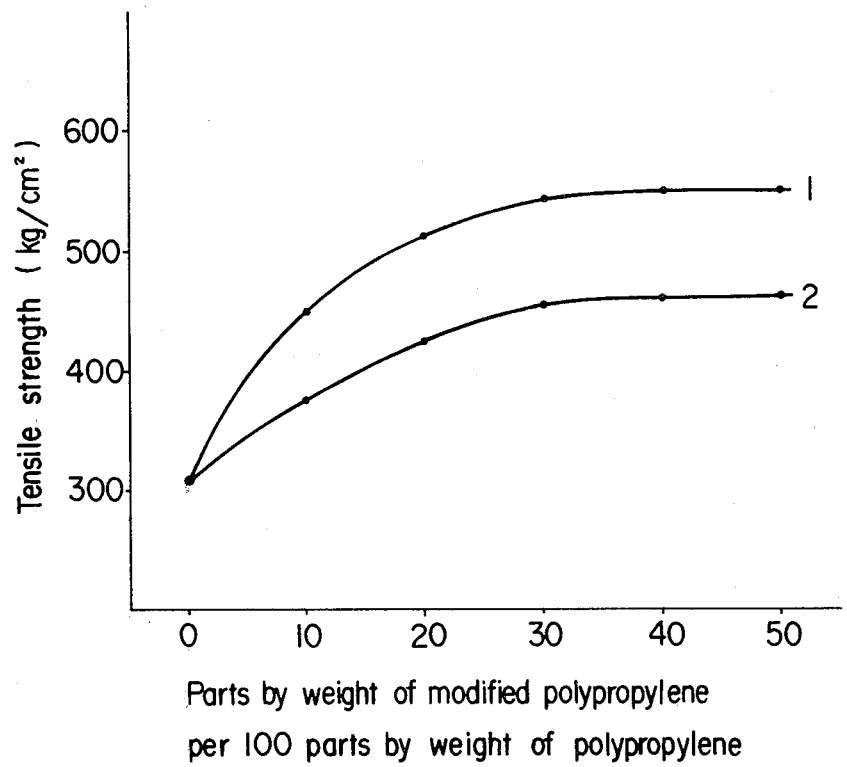

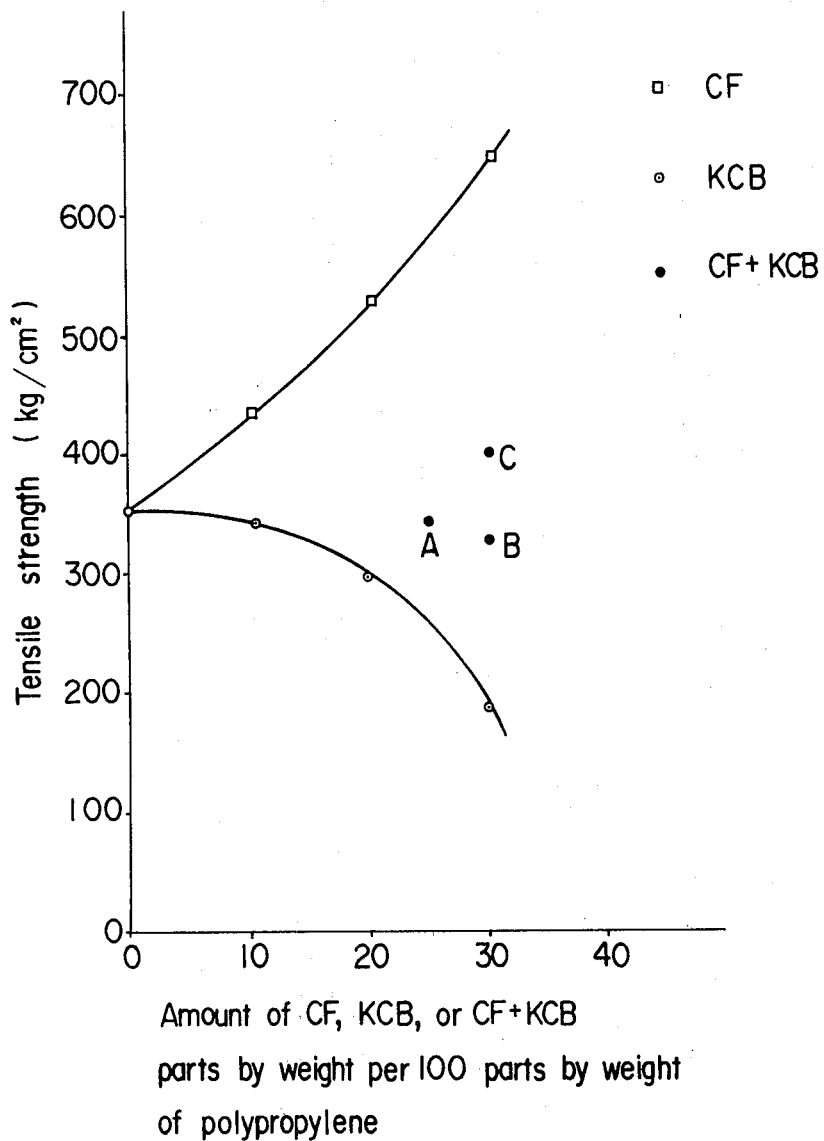

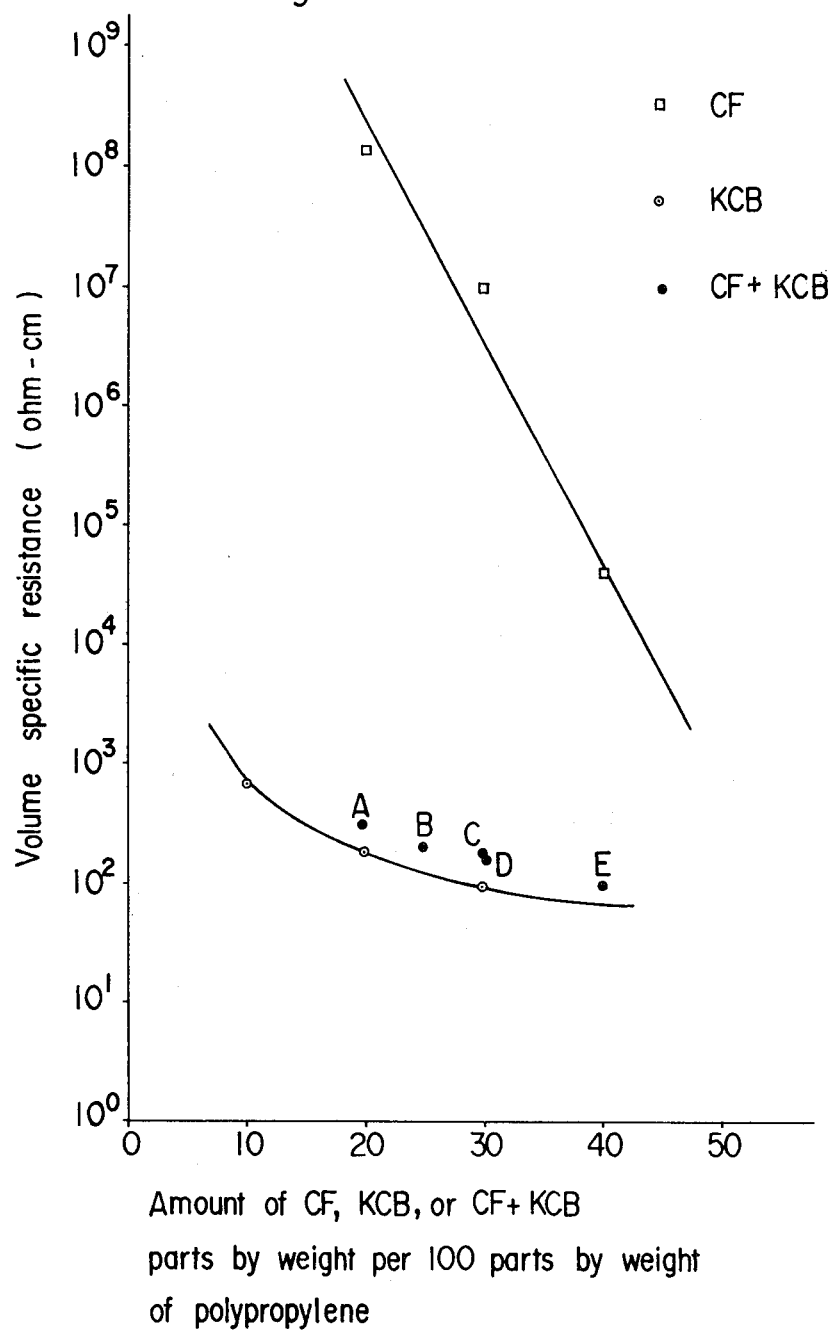

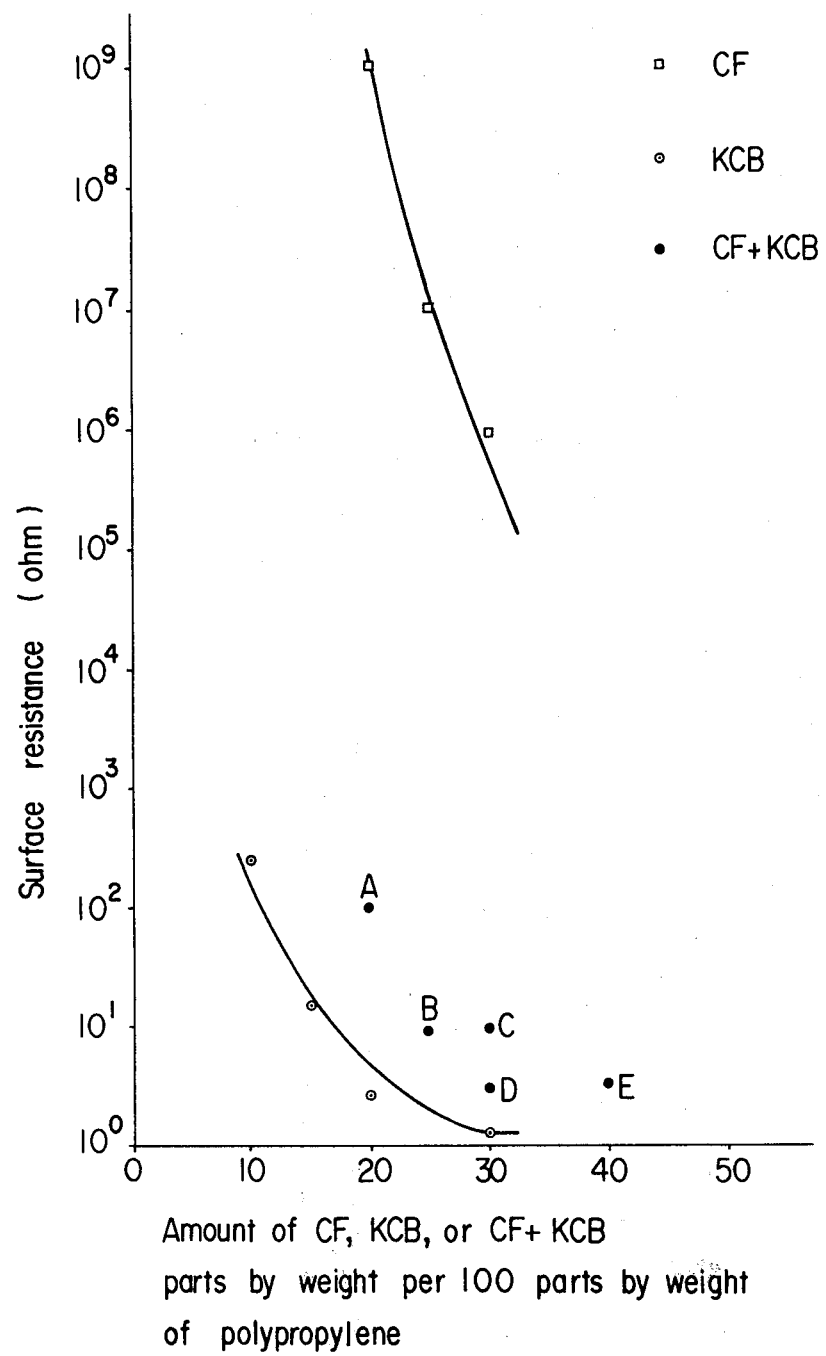

ELECTROCONDUCTIVE RESIN COMPOSITE MATERIAL FOR MOLDING

SUMMARY OF THE INVENTION

The present invention relates to an electroconductive resin composite material suitable for molding having favorable mechanical strength and excellent electrical properties. More particularly the present invention relates to a polypropylene composite material containing polypropylene, a modified polypropylene, carbon fiber and electroconductive carbon black.

BACKGROUND OF THE INVENTION

It has been hitherto publicly known to compound carbon fiber into plastics to obtain composite materials. It has also been well known that the thus obtained composite material shows improved properties in mechanical strength such as tensile strength and bending strength and heat-resistance. However, no improvement has been observed in its electrical properties.

On the other hand, the improvement of the electrical properties of a composite material has been achieved by compounding electroconductive carbon black into a plastic material. In these cases, it has been found that polypropylene provides better electrical properties then polyvinyl chloride, polystyrene and polyethylene. However, a composite material of polypropylene and electroconductive carbon black does not have sufficient in mechanical strength.

Accordingly, it has been considered that both the mechanical strength and the electrical properties of the composite material could be improved by compounding carbon fiber and electroconductive carbon black into plastics. Although such a composite can be achieved easily on an experimental scale, the incompatability of the plastics with carbon fiber and carbon black during compounding caused a reduction in the strength of the composite material and the stability of the molded composite material was sufficient over a long time period.

Accordingly, an object of the present invention is to provide a composite polypropylene resin material having good electrical properties and sufficient mechanical strength that can be easily compounded and readily molded without degradation of its strength and electrical properties.

In accordance with the present invention, this is achieved by compounding with the polypropylene, carbon fiber and electroconductive carbon black, a modified polypropylene in an amount of from 10–50 parts by weight based on 100 parts by weight of polypropylene obtained either by chemically modifying polypropylene with an organic unsaturated carboxylic acid or by copolymerizing polypropylene with the carboxylic acid.

BRIEF EXPLANATION OF DRAWINGS

Of the attached drawings, FIG. 1 shows the relationship between the tensile strength of a composite material comprising 50 parts by weight of carbon fiber, 10 parts by weight of electroconductive carbon black, 100 parts by weight of polypropylene and the illustrated amount of modified polypropylene.

Curve 1 of FIG. 1 shows this relationship in a composite material containing a modified polypropylene obtained by chemically modifying a part of polypropylene with maleic acid and Curve 2 shows the relationship in a composite material containing a modified polypropylene obtained by copolymerizing propylene and acrylic acid.

FIG. 2 shows the change in mechanical strength of a composite material with the addition of the illustrated amount of either carbon fiber (CF) or electroconductive carbon black (KCB), or both of them (CF+KCB). The weight ratio of carbon fiber to electroconductive carbon black in the cases where both of them are adding is 10:15 in A, 10:20 in B and 20:10 in C.

FIG. 3 shows the change of volume specific resistance of a composite material comprising 100 parts by weight of polypropylene, 17 parts by weight of polypropylene modified with 2 parts by weight of maleic acid per 100 parts by weight of polypropylene and either the illustrated amount of carbon fiber or the illustrated amount of electroconductive carbon black, or the illustrated amount of carbon fiber and electroconductive carbon black. In the last case, the weight ratio of carbon fiber to electroconductive carbon black is 10:10 in A, 10:15 in B, 20:10 in C, 10:20 in D and 30:10 in E.

FIG. 4 shows the change in surface resistance of the same composite materials used in FIG. 3.

DETAILED DESCRIPTION OF THE INVENTION

The present invention relates to an electroconductive resin composite material suitable for molding having excellent mechanical strength and electrical properties. The resin is obtained by compounding 10 to 50 parts by weight of modified polypropylene, obtained by modifying polypropylene with an organic unsaturated carboxylic acid having 3 to 10 carbon atoms or by copolymerizing propylene and the organic unsaturated carboxylic acid, from 5 to 65 parts by weight of carbon fiber, having a diameter from 5 to 20 micrometers and a ratio of length to diameter of not less than 10, and from 5 to 65 parts by weight of electroconductive carbon black, having a specific surface area of at least 800 $cm^2/g$ with 100 parts by weight of polypropylene.

The modified polypropylene is polypropylene chemically modified with an organic unsaturated carboxylic acid of 3 to 10 carbon atoms or a copolymer of propylene with an organic unsaturated carboxylic acid of 3 to 10 carbon atoms, said modified polypropylene containing 0.5 to 8.0 mol % of said organic unsaturated carboxylic acid as carboxylic acid units, and preferably from 1 to 5 mol %. Organic unsaturated carboxylic acids suitable for use in the modification include maleic acid, acrylic acid, methacrylic acid, endobicyclo[2.2.1]5-heptene-2,3-dicarboxylic acid, itaconic acid and the like, and their anhydrides, preferably, maleic anhydride.

If the amount of modified polypropylene in the composite material of the present invention is less than that in the range specified in the present invention, the mechanical property and the compatability of the composite material are reduced. On the other hand, where the amount is more than that in the range specified in the present invention, there is a tendency for it to reduce the heat-resistance of the composite material.

The carbon fiber used in the present invention is from 5 to 20 micrometers in diameter and has a ratio of length to diameter of not less than 10. The amount used is 5 to 65 parts by weight, preferably 10 to 40 parts, per 100 parts by weight of polypropylene.

The electroconductive carbon black used in the present invention is extremely high in electroconductivity as compared to conventional carbon black used for general purposes and is characterized in that it has a specific surface area of at least 800 m$^2$/g Ketchenblack E.C. (the trade mark name of an electroconductive carbon black made by Lion-Aczo Company) is suitable for use in the present invention, the amount being generally from 5 to 65 parts, and preferably from 10 to 40 parts by weight, per 100 parts by weight of polypropylene.

The electrical properties of the composite material obtained by compounding the modified polypropylene, the carbon fiber and the electroconductive carbon black with polypropylene are almost the same as those of a composite material obtained by compounding the carbon black with a base material comprising polypropylene and modified polypropylene. However, no reduction in mechanical strength is observed in the composite material according to the present invention as is seen in FIG. 2.

As is seen in FIGS. 3 and 4, the electrical properties (volume specific resistance and surface specific resistance, respectively) of a composite material made by compounding both the short carbon fiber and electroconductive carbon black with the base material comprising polypropylene and modified polypropylene are almost the same as those of a composite material obtained by compounding the electroconductive carbon black with the same base material. Moreover they are significantly improved as compared to those obtained by compounding only carbon fiber with the basic material. Such improved electrical properties have been for the first time attained by including modified polypropylene in the composite material and its industrial value is remarkably high.

Of the above-mentioned ratios for compounding, it is particularly preferable that the sum of the amount of polypropylene and that of modified polypropylene as the base material be at least 60% by weight of the composite material.

The composite material according to the present invention is easily processable in a conventional screw-type extruder is readily moldable. In this regard, a composite material made by compounding only the electroconductive carbon black with a base material of polypropylene and modified polypropylene clogs a conventional screw-type extruder, and so, is difficult to continuously extrude.

As has been described, since the composite material according to the present invention retains high mechanical strength and also shows excellent electrical properties, the composite material according to the present invention can be naturally used for removing static electricity, and also can be used in general electroconductive purposes, for instance, electroplating.

The constitution and effects of the present invention will be concretely explained more in detail while referring to the non-limitative examples as follows:

EXAMPLE 1

Into 100 parts by weight of polypropylene of melt index of 9.0, was compounded 17 parts by weight of a modified polypropylene obtained by chemically modifying the polypropylene with 2% of maleic acid, of melt index of 20.0 and melting point (by DSS method) of 158° C., 17 parts by weight of carbon fiber of 15 micrometer in diameter, the ratio being length to diameter of 50, (manufactured by Kureha Kagaku Kogyo Kabushiki Kaisha, grade of M 107) and 34 parts by weight of electroconductive carbon black (manufactured by Lion-Aczo Co., Ltd., under the trademark Ketchenblack E.C.) to form a blend mixture. The blend was then injection-molded by a conventional method. The electric properties and mechanical strength of specimens of the thus prepared composite material were as follows:
volume specific resistance: 1.0×10$^2$ ohm.cm,
surface specific resistance: 2.5 ohm and
tensile strength: 3.3 kg/cm$^2$.

EXAMPLE 2

By using the same respective raw materials as in EXAMPLE 1, a mixture having a composition of 100 parts by weight of polypropylene, 15 parts by weight of modified polypropylene, 15 parts by weight of carbon fiber and 23 parts by weight of electroconductive carbon black was prepared and subjected to injection-molding to form pelletized composite material. The electric properties and the mechanical strength of specimens made from the pellets were as follows:
volume specific resistance: 1.7×10$^2$ ohm.cm
surface specific resistance: 8.0 ohm and
tensile strength: 3.4 kg/mm$^2$.

EXAMPLE 3

By using the same respective raw materials as in Example 1, a mixture having a composition of 100 parts by weight of polypropylene, 17 parts by weight of modified polypropylene, 34 parts by weight of carbon fiber and 17 parts by weight of electroconductive carbon black was prepared and subjected to injection-molding to form a pelletized composite material. The electric properties and the mechanical strength of specimens of the pellets were as follows:
volume specific resistance: 2.0×10$^2$ ohm.cm,
surface specific resistance: 1.3 ohm and
tensile strength: 4.0 kg/mm$^2$.

COMPARATIVE EXAMPLES 4–6

By using the same respective raw material as in Example 1, three kinds of composite materials having the compositions shown in Table I were prepared by compounding and injection-molding. The properties of the respective specimens are also shown in Table 1:

TABLE 1

| Composite material | 4 | 5[(1)] | 6 |
|---|---|---|---|
| Composition (part by weight) | | | |
| Polypropylene | 100 | 100 | 100 |
| Modified polypropylene | 17 | 17 | 0 |
| Carbon fiber | 51 | 0 | 25 |
| Carbon black (electroconductive) | 0 | 51 | 25 |
| Volume specific conductivity (ohm · cm) | 1.4 × 10$^7$ | 1.0 × 10$^2$ | 1.7 × 10$^2$ |
| Surface specific conductivity (ohm) | 1.0 × 10$^6$ | 1.5 | 1.6 |
| Tensile strength (kg/mm$^2$) | 4.5 | 1.9 | 2.8 |

Note;
[(1)]Since the mixture could not be processed by extrusion, it was molded by a press.

As is seen in Table 1 and by taking the results of Examples 1 to 3 into consideration:
(1) composite material free of modified polypropylene (Composite material No. 6) showed a lower mechanical strength, in spite of its high content of carbon fiber and electroconductive carbon black, than that according to the present invention. (2) The composite material containing a larger amount of electroconductive carbon black (composite natural No. 5) was poor in processability, in spite of it also containing modified polypropylene. It could not be extruded and showed a poor mechanical strength. (3) The composite material free of electroconductive carbon black (Composite material No. 4) showed very high electric resistance and thus could not be used for the purpose of the present invention.

What is claimed is:

1. A resin composite material consisting essentially of 100 parts by weight of polypropylene, from 10 to 50 parts by weight of a modified polypropylene, said modified polypropylene being polypropylene chemically modified with an organic unsaturated carboxylic acid of 3 to 10 carbon atoms or a copolymer of propylene and an organic unsaturated carboxylic acid of 3 to 10 carbon atoms, said modified polypropylene containing 0.5 to 8.0 mol% of said organic unsaturated carboxylic acid as carboxylic acid units, from 5 to 65 parts by weight of carbon fiber having a diameter of from 5 to 20 micrometers and a ratio of length to diameter of not less than 10 and from 5 to 65 parts by weight of electroconductive carbon black having a specific surface area of not less than 800 $m^2/g$.

2. The resin composite material of claim 1, wherein the total amount of polypropylene and modified polypropylene is more than 60% by weight of the total amount of said composite material.

3. The resin composite of claim 1 containing from 10 to 40 parts by weight of carbon fiber.

4. The resin composite of claim 1 containing from 10 to 40 parts by weight of electroconductive carbon black.

5. The resin composite material of claim 1 wherein the carboxyclic acid is selected from the group consisting of maleic, acrylic methacrylic, endobicyclo [2,2,1]5-heptene-2,3-dicarboxylic and itaconic acids and their anhydrides.

6. The resin composite of claim 5 wherein the carboxylic acid is maleic acid.

7. The resin composite of claim 1 wherein the modified polypropylene contains from 1 to 5 mol% of said organic unsaturated carboxylic acid as carboxylic acid units.

* * * * *